United States Patent [19]

Helams

[11] 4,195,860
[45] Apr. 1, 1980

[54] OFFSET ADAPTER
[75] Inventor: Paul A. Helams, Dallas, Tex.
[73] Assignee: Austin Industries, Inc., Dallas, Tex.
[21] Appl. No.: 857,606
[22] Filed: Dec. 5, 1977
[51] Int. Cl.² .................. A01D 35/26; B60D 1/14
[52] U.S. Cl. .................. 280/460 A; 56/15.5; 56/503; 172/446; 172/451; 280/415 R
[58] Field of Search .............. 280/467, 460 A, 461 A, 280/472, 415 R, 415 A, 490 R, 490 A; 172/446, 439, 673, 451, 646, 656, 744, 762, 448, 680; 56/15.5, 15.6, 15.9, 503

[56] References Cited
U.S. PATENT DOCUMENTS

| | | | |
|---|---|---|---|
| 2,575,801 | 11/1951 | Evans | 172/451 |
| 2,593,176 | 4/1952 | Patterson | 172/680 |
| 2,653,531 | 9/1953 | Collins | 280/461 A |
| 2,775,179 | 12/1956 | Chambers | 172/272 |
| 3,106,254 | 10/1963 | Clark | 280/415 |
| 3,177,639 | 4/1965 | Hardee | 56/503 |
| 3,472,528 | 10/1969 | Richey | 280/461 A X |
| 3,657,866 | 4/1972 | Burroughs | 56/15.5 |
| 3,841,415 | 10/1974 | Koenig | 172/439 |
| 3,989,272 | 11/1976 | McCanse | 280/460 A |
| 4,019,755 | 4/1977 | Eisenhardt | 280/490 A |

FOREIGN PATENT DOCUMENTS 219711  11/1957  Australia .................. 280/461 A Primary Examiner—Joseph F. Peters, Jr.
Assistant Examiner—Randall A. Schrecengost
Attorney, Agent, or Firm—Richards, Harris & Medlock

[57] ABSTRACT

An offset adapter dimensioned to connect different farm implements in offset relation to a tractor with a three point lift. The adapter is reversible to offset the implement to the right or to the left, and it is constructed to facilitate vertical adjustments of the implement with respect to the terrain. The adapter has a bar depending from which are brackets connectable to first and second hitching points on the implement. The first bracket is rigidly mounted to the bar and is designed to be connected to one of the implement hitching points; and the second bracket may be slidably disposed along the bar, but is capable of rigid attachment at a position on the bar corresponding to the position of a second implement hitching point. Two mountings are also provided for attachment of the bar to a conventional three point lift. The unique positioning of brackets over mountings permits accommodation of implements having different width hitch points, yet also is capable of being reversed so an implement can be offset in a different direction.

6 Claims, 3 Drawing Figures

OFFSET ADAPTER

BACKGROUND OF THE INVENTION

1. Field of the Invention

The invention relates to hitch devices, and more particularly to an adapter for connecting different implements in offset relation to a tractor or draft vehicle.

2. Description of the Prior Art

Certain dimensions for agricultural implements and tractor hitches, including the size and location of hitch pins for implements and the size and position of hitching points thereon to which tractor linkages are connected, are governed by American Society of Agricultural Engineering Standards in accordance with power requirements for pulling implements. According to the ASAE standards, implements and tractor hitches are divided into three categories:

| Category | Maximum Drawbar Horsepower |
|---|---|
| I | up to 45 |
| II | 40–100 |
| III | 80 and above |

Previous hitching devices, such as the convertible tractor hitch disclosed by Ritchey in U.S. Pat. No. 3,472,528, permitted the connection of category I or II implements to category I or II tractors, but could not be used to offset the implement to the right or to the left of the tractor path. Offsetting an implement from the tractor is especially desirable, for example, with the use of a cutter or mower for mowing between, around and beneath trees or other obstacles. While tractor hitches such as those disclosed by Chambers in U.S. Pat. No. 2,775,179 and by McCanse in U.S. Pat. No. 3,989,272 provide a connection whereby the implement may be offset to the right or to the left of the tractor, neither hitch is capable of being connected to the wide variety of implements the farmer may have on hand, many of which will have different hitching positions. The McCanse hitch which is actually formed on the front end of the implement is not capable of adapting different hitches to different tractors in offset relation. The hitch disclosed by Chambers is adapted to be clamped to a rectangular tool bar to which an implement is also clamped. Such a structure is not suitable for connection to modern farm implements which have cantilevered hitching points or clevises mounted on the front edge for connection to a tractor with a three point hitch.

SUMMARY OF THE INVENTION

In accordance with the present invention an offset adapter is provided for connecting an implement having at least two hitching points in offset relation to a tractor having a three point lift. The adapter comprises a bar to be disposed behind the tractor and positioned transverse its path. A first depending bracket, dimensioned to be connected to a first hitching point on the implement, is rigidly mounted to the bar. A second depending bracket may be adjustably disposed along the bar and is capable of rigid fixation at a position on the bar corresponding to the location of a second hitching point on the implement. The arms of the three point lift are connected to the bar at positions offset relative to the location of the first and second brackets so that the implement will be laterally offset from the tractor when connected to the adapter and the adapter to the three point lift.

DESCRIPTION OF THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENT

Figure 1:
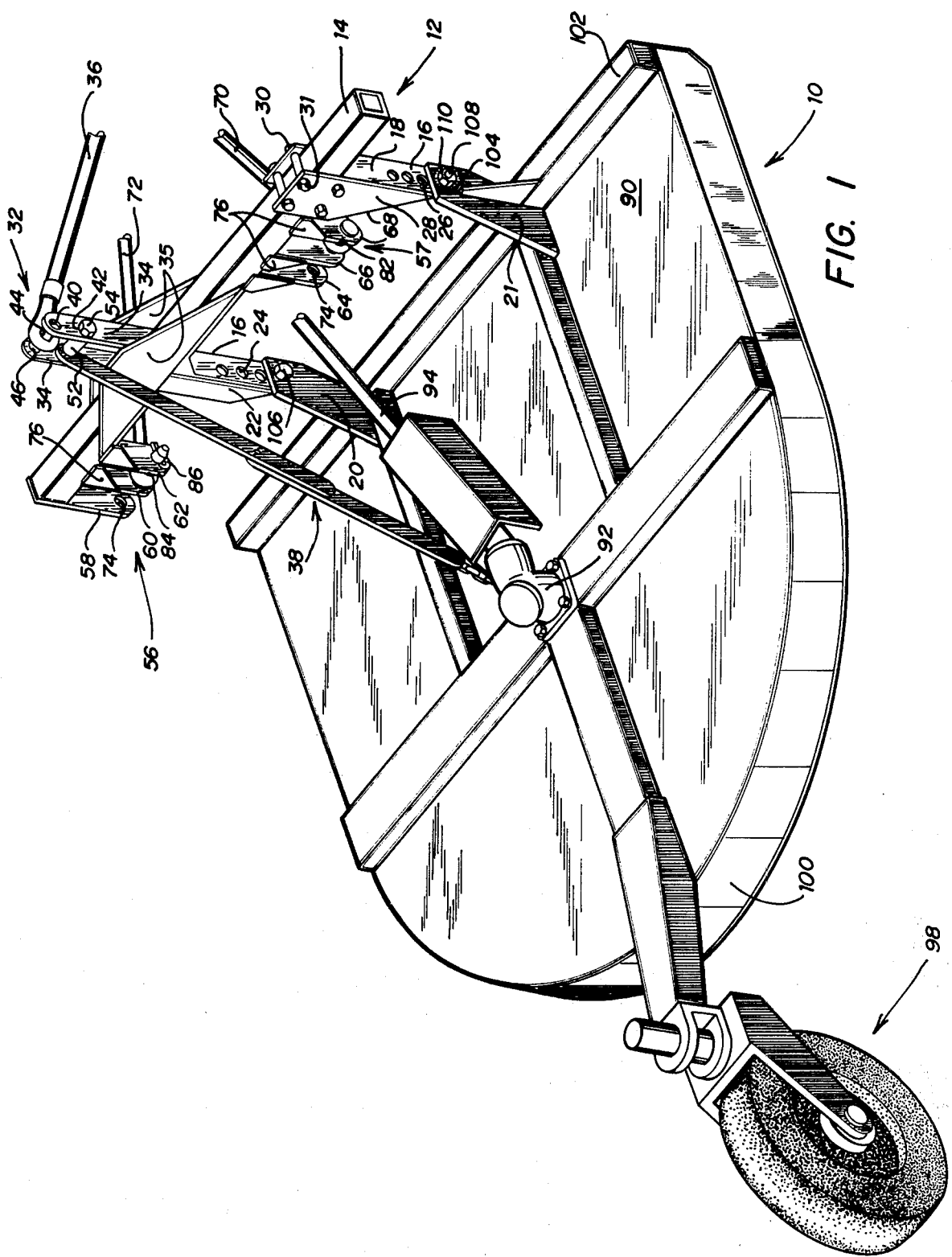
FIG. 1 is a perspective view of an adapter embodying the invention which adapter has been attached to a rotary cutter.

Referring to the drawings generally, there is shown a farming implement 10, such as a rotary mower, a rotary cutter or other agricultural implement, hitched to a conventional tractor by means of an offset adapter 12. Many modern implements are manufactured with hitching points or clevises designed for use with tractors having three point lifts or hitches. The actual position of the hitching points on the implement may vary with the implement depending upon the type of tractor by which it is designed to be pulled. The present invention makes it possible to pull many different implements with hitching points in different positions with different sized tractors in offset relation. The design of the adapter also facilitates the raising and lowering of the implement with respect to the terrain.

Figure 2:
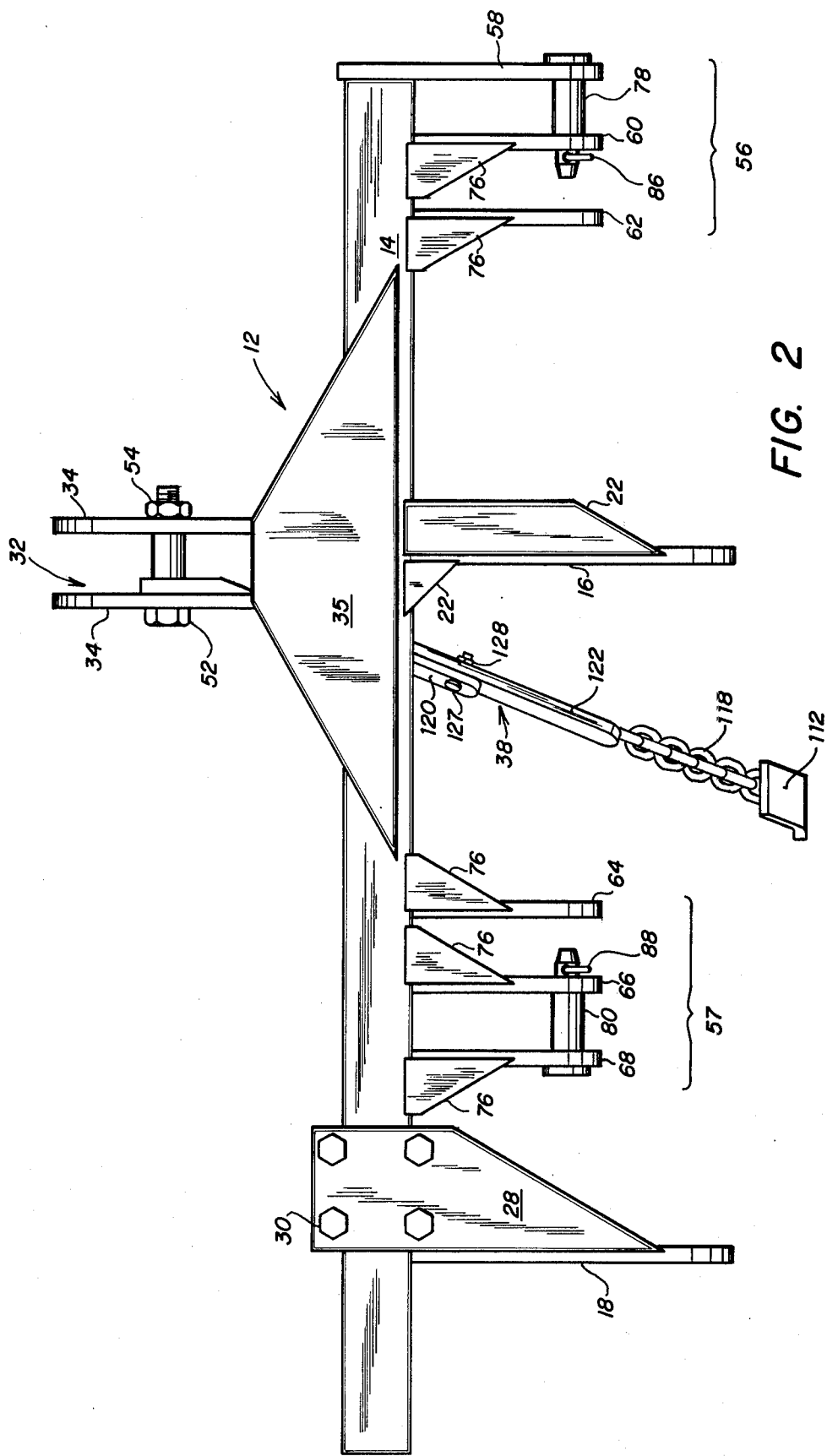
FIG. 2 is a front view of the embodiment shown in FIG. 1, without the cutter.

Referring now to FIGS. 1 and 2, an offset adapter 12 is made of an elongated steel bar 14 with rectangular faces disposed transverse the path of implement 10. Mounted to bar 14 and depending therefrom is a fixed bracket 16 and an adjustable bracket 18, both of which are dimensioned to be attached to first and second cantilevered hitching points, or mounts 20 and 21, formed near the front edge of implement 10. Bracket 16 is rigidly mounted to bar 14 and depends therefrom perpendicular to the terrain. Steel webbing 22 is disposed perpendicular to the plane of fixed bracket 16 on the front and rear faces of bar 14 to provide structural support at the bar-bracket junction. A series of apertures 24, disposed along the length of bracket 16 in a line perpendicular to the terrain, permit bracket 16 to be bolted to mount 20.

Adjustable bracket 18 is slidably disposed along bar 14 at a distance from bracket 16 compatable with the separation between mounts 20 and 21. A series of apertures 26 are likewise disposed along adjustable bracket 18 through which the second mount 21 on the implement 10 may be bolted. Two parallel webbing plates 28 are disposed perpendicular to the plane of bracket 16 against the front and rear faces of bar 14. Four bolts 30 pass through the two plates, two disposed above bar 14, two below it, to secure bracket 18 at the desired position along the bar. Nuts 31 disposed on bolts 30 compress the plates together to fix bracket 18 on the bar. When nuts 31 are loosened, adjustable bracket 18 can slide along bar 14 to accommodate various distances between mounts 20 and 21. At the point along bar 14 at which fixed bracket 16 depends, a mount 32 extends upwardly from bar 14 parallel to bracket 16. Mount 32 is formed of two parallel bracket plates 34, between which can be pivoted the top arm 36 of a three point lift as well as an arm 38 through apertures 40 and 42, respectively, formed in each plate 34. Steel webbing 35, disposed about the front and rear faces of bar 14 provides support for the junction of mount 32 and bar 14. Arm 36 terminates in an eye 44 by which arm 36 may be pivotally connected to mount 32 by means of a pin 46 disposed through aperture 40 in the mount and eye 44.

Figure 3:
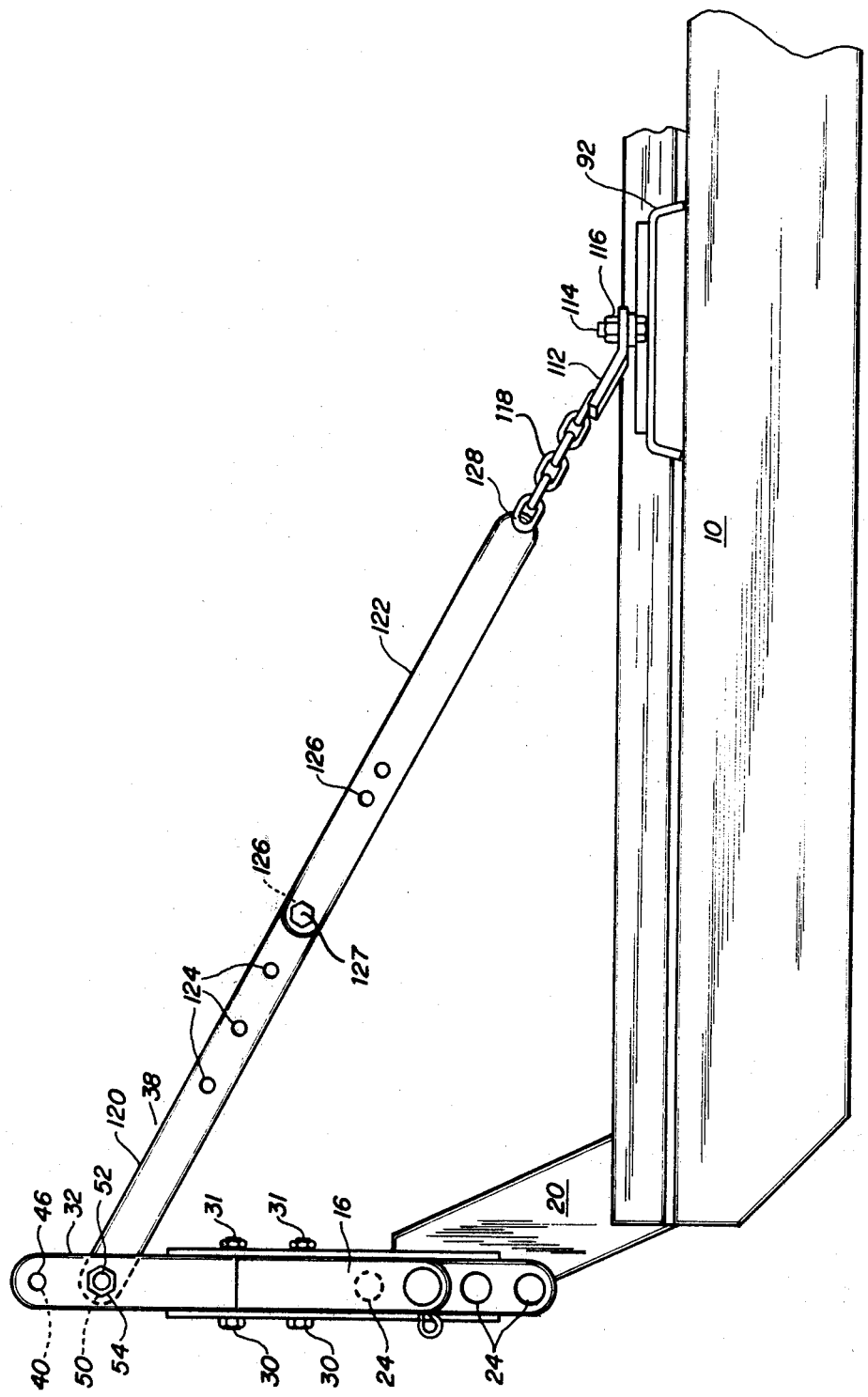
FIG. 3 is a side view of the FIG. 1 embodiment, partially cutaway.

As shown in FIGS. 1 and 3, one end of arm 38 has an aperture 50 defined therein through which is passed a bolt 52 secured by a nut 54 used to retain arm 38 in mount 32. By loosening nut 54 arm 38 can be pivoted about bolt 52 at an angle which renders arm 38 connectable to a third hitching point on the implement.

In the preferred embodiment of the present invention, two mounts 56 and 57 are spaced along bar 14 and depend vertically therefrom, one mounting being disposed on each side of mount 32. Each mount 56 and 57 contains ears, 58, 60, 62 and 64, 66, 68, respectively, which depend from bar 14 parallel to brackets 16 and 18. Mounts 56 and 57, which are dimensioned to be connected to bottom lift arms 70 and 72 of the tractor, are positioned along bar 14 on each side of mount 32 equidistant therefrom, so that brackets 16 and 18 to which the implement is connected are laterally offset therefrom. Each of the ears 58, 60, 62, 64, 66 and 68 has an aperture 74 therein for pivotal connection with lift arms 70 and 72.

As best seen in FIG. 2, mount 56 is disposed on the far edge of bar 14 with ear 58 coextensive with one end of the bar. On the opposite side of mount 32 is a second mount 57 disposed between adjustable bracket 18 and mount 32. The junctions between ears 60, 62, 64, 66 and 68 and bar 14 are provided structural support by webbing 76, which is mounted perpendicular to the plane of each lug against the tractor and implement faces of bar 14.

Ears within each mount 56 and 57 are spaced relative to one another such that corresponding pairs in each mount have different separation, making adapter 12 connectable to either a category I or category II tractor, for example. The spacing between ears 58 and 60 in mount 56 and ears 66 and 68 in mount 57 provide for connection to a category II tractor. The spacing between ears 60 and 62 in mount 56 and ears 64 and 66 in mount 57 correspond to the size of the lift arms for category I tractors.

As shown in FIG. 2, connecting pins 78 and 80 are disposed through the aperture 74 in each of ears 58, 60, 66 and 68 for connection to a category II tractor. Connecting pins 78 and 80 are disposed through eyes 82 and 84 defined in the terminus of lift arms 70 and 72, respectively. Pins 78 and 80 are secured between respective ears by retaining pins 86 and 88, as shown in FIG. 2.

FIGS. 1 and 3 illustrate the connection of implement 10 to the offset adapter 12. The rotary cutter shown in the drawings designated by the numeral 10 is exemplary only; it will be understood that the present invention is capable of connecting a wide variety of implements or other towed vehicles. As in the rotary cutter shown herein, an implement 10 may have a relatively flat surface 90 which will be outfitted with a gearbox 92 to which is connected a drive shaft 94 from the tractor. Such implements may also have a tailwheel assembly 98 disposed along the trailing edge which provides support for the implement.

The front edge 102 of the implement contains two cantilevered mounts 20 and 21 extending from surface 90. Each mount contains an aperture 104 through which mounts 20 and 21 may be bolted to fixed brackets 16 and adjustable bracket 18 by bolts 106 and 108 which pass therethrough and which are secured by nuts 110. The spacing between mounts 20 and 21 will vary with the implement, but with suitable adjustment of bracket 18 proper connection to a wide variety of hitching positions is possible.

A third hitching point for the particular implement shown in the drawings is provided by an angle bracket 112 which is bolted to surface 90 by means of a bolt 114 and secured thereto by nut 116. Angle bracket 112 forms an obtuse angle, with bolt 114 passing therethrough. Bracket 112 is also welded to one end of a flexible steel chain 118. The other end of chain 118 is connected to connecting brace 38, the other end of which is mounted to mount 32 of the adapter.

Arm 38 comprises two relatively flat members, an upper brace member 120 and a lower brace member 122, both of which are joined through an aperture 124 in the lower end of upper brace member 120 and an aperture 126 in the upper end of the lower brace member 122. A series of apertures 124 are provided along the lower end of upper brace member 120 and a series of apertures 126 along the upper end of lower brace 122 to make the length of connecting brace 38 variable by a suitable choice of aperture 124 and aperture 126. A bolt 127 is passed through apertures 124 and 126, which are placed in alignment, and secured by nut 128.

The height of the implement 10 above the terrain is variable by vertical adjustment of the lift arms of the tractor and by adjustments of the adapter where it is connected to the three hitching points. Mounts 20 and 21 may be bolted to a proper choice of apertures 24 in brackets 16 and apertures 26 in bracket 18 to facilitate height adjustments. In the length of arm 38 can provide a suitable connection between the adapter and the third hitching point.

It should be appreciated that adapter 12 may be placed between implement 10 and the tractor such that the implement 10 is offset either to the left or the right of the tractor. The offsetting is reversible by merely rotating bar 14 180 degrees so that the implement will be offset to the opposite side.

The construction of the present invention makes it possible to not only connect a wide variety of the farm implements manufactured for use with tractors with three point lifts to different sized implements, but to offset the implement on either side of the tractor by means of a single element, the adapter, in a way which has not been possible before. Moreover, the design of the present invention enhances adjustment of the position of the implement with respect to the terrain.

Although particular embodiments of the invention have been described herein, it will be understood that the invention is not limited to the embodiments disclosed, but is capable of rearrangement, modification and substitution of parts and elements without departing from the spirit and scope of the invention.

What is claimed is:

1. An offset adapter dimensioned to connect an implement having at least two hitching points in offset relation to the three point lift of a tractor, said adapter comprising:
   a bar;
   a first bracket depending from said bar, said bracket being adapted to be coupled to a first hitching point on the implement; and a second bracket depending from said bar, said second bracket capable of being coupled to a second hitching point on the implement, said first and second brackets being positioned along the bar so that an implement attached thereto will be offset to one side of the center of the tractor;

a first mount depending from and affixed to said bar laterally of said first bracket in one direction;

a second mount depending from and affixed to said bar laterally of said first bracket in the opposite direction from said first mount; and a support means upstanding from and affixed to said bar centrally of said first and second mounts, said mounts being adapted to be attached to the lower arms of the three point lift and the support means to the top arm of the three point lift, and said bar, brackets and mounts being adapted to be rotated in a plane parallel to the ground 180 degrees to permit attachment of the implement so that it is offset to the other side of the path of travel of the vehicle.

2. The adapter as defined in claim 1 whereby the distance between the implement and the bar is adjustable by bolting each of said first and second hitching points to one of a series of apertures provided in each of said first and second brackets for accommodating the heights of different hitching points on the implement.

3. The adapter as defined in claim 1 for use with an implement having three hitching points, which adapter further includes:

means connected to said bar for attachment to a third hitching point on said implement.

4. The adapter as defined in claim 3 wherein said means includes:

an arm removably attached to said bar and disposed rearwardly therefrom, said arm being reversible to permit attachment to said third hitching point on said implement when said implement is offset to a different side of the path of travel of the tractor.

5. An offset adapter dimensioned to connect an implement having three hitching points in offset relation to a three point lift tractor, comprising:

a bar positionable transverse the path of the tractor and capable of being rotated by 180 degrees relative thereto for offsetting the implement on the other side of the tractor;

a first bracket rigidly mounted to said bar and depending therefrom, adapted to be bolted to a first of the implement hitching points;

a second bracket slidably disposed along said bar and depending therefrom, said second bracket capable of being fixed at a position on said bar to enable it to be bolted to a second of said implement hitching points, each of said first and said second brackets having a plurality of apertures vertically positioned therein to permit the height of the implement to be adjusted above the terrain by attachment of the implement hitching points to different apertures;

two mountings depending from said bar, each of said mountings being adapted to receive one of the bottom arms of the three point lift tractor, said mountings being positioned on said bar offset relative to said first and second brackets so that an implement attached to said brackets will be laterally offset from said tractor; and adjustable support means connected at one end to said bar and at the other end to a third hitching point on said implement, said support means being adjustable in length to permit connection to a variety of different implements.

6. The offset adapter as defined in claim 5, wherein each mounting means, spaced apart on said bar, to permit connection to the bottom lift arms of a relatively narrow three point lift and to permit connection to a relatively wide three point lift.

* * * * *